United States Patent [19]

Martin et al.

[11] Patent Number: 5,171,602
[45] Date of Patent: Dec. 15, 1992

[54] NON-FAT FROZEN DAIRY PRODUCT

[75] Inventors: Robert W. Martin, Mundelein, Ill.;
Dennis C. Brooks, Weston, Conn.;
Mark A. Robinson, Deerfield, Ill.

[73] Assignee: Kraft General Foods, Inc., Northfield, Ill.

[21] Appl. No.: 733,703

[22] Filed: Jul. 22, 1991

Related U.S. Application Data

[63] Continuation-in-part of Ser. No. 538,216, Jun. 13, 1990, abandoned.

[51] Int. Cl.$^5$ .......................... A23G 9/02; A23G 9/04
[52] U.S. Cl. ..................................... 426/567; 426/578; 426/658; 426/804
[58] Field of Search ............... 426/567, 565, 566, 804, 426/101, 249, 578

[56] References Cited

U.S. PATENT DOCUMENTS

| | | | |
|---|---|---|---|
| 2,263,483 | 12/1941 | Bawmann | 426/567 |
| 2,459,108 | 1/1949 | Lolkema | 260/209 |
| 2,590,077 | 3/1952 | Lolkema | 426/566 |
| 2,641,546 | 6/1953 | Decker | 99/136 |
| 3,335,013 | 8/1967 | Wolfmeyer | 426/565 |
| 3,345,185 | 10/1967 | Pisani et al. | 426/565 |
| 3,345,358 | 10/1967 | Inklaar | 426/565 |
| 3,510,316 | 4/1970 | Decker | 426/567 |
| 3,986,890 | 10/1976 | Richter et al. | 426/578 |
| 4,510,166 | 4/1985 | Lenchin et al. | 426/565 |

FOREIGN PATENT DOCUMENTS

| | | | |
|---|---|---|---|
| 1-196261 | 8/1989 | Japan | 426/567 |
| 0581608 | 6/1988 | U.S.S.R. | 426/565 |

OTHER PUBLICATIONS

APC, Application of Hendrikx et al., Ser. No. 395,395½ published May 4, 1943.
Arbuckle, W. S. 1972, "Ice Cream", 2nd ed., AVI Pub., Westport, Conn., pp. 39–82–86, 208–222.

Primary Examiner—Jeanette Hunter
Attorney, Agent, or Firm—Fitch, Even, Tabin & Flannery

[57] ABSTRACT

The non-fat frozen dairy dessert product of the present invention comprises on a non-flavored basis, from about 8% to about 18% of milk solids not fat, from about 6% to about 15% of a natural sweetener, such as sucrose, from about 6% to about 15% of low dextrose equivalent corn syrup solids having a dextrose equivalent (DE) of from about 25 to about 36, from 0% to about 6% of high DE corn syrup solids having a DE of from about 36 to about 95, from 0% to 6% of dextrin having a DE of less than about 20, from about 0.5% to about 3% unmodified starch and from about 0% to about 0.5% stabilizer.

23 Claims, No Drawings

NON-FAT FROZEN DAIRY PRODUCT

REFERENCE TO RELATED APPLICATION

This application is a continuation-in-part of application Ser. No. 538,216 filed Jun. 13, 1990, now abandoned.

FIELD OF THE INVENTION

The present invention relates generally to a substantially fat-free frozen desert product which has organoleptic characteristics, stability and body corresponding to those of milk fat-containing ice cream products. More particularly, the present invention relates to a simple and inexpensive formulation and method for producing a non-fat frozen dairy dessert product which has surprising stability, flavor, mouthfeel and body characteristics.

BACKGROUND OF THE INVENTION

Physically, ice cream is the most complex of dairy products, being a three-phase system consisting of air, liquid and solids. The desirable structure of ice cream, expressed in terms of body and texture, is due to the physical effects of homogenization, whipping and freezing and to the type, source and pretreatment of the mix ingredients. Ice cream can be classified as a foam, or a physico, chemical system containing a gas (air) dispersed in a liquid. Ice cream is a complicated foam, the continuous phase representing a partly frozen emulsion, the ice crystals and the solidified fat globules being embedded in the unfrozen water phase. Typically, in conventional ice cream formulations, the higher the fat level, the more pleasing and appetizing the texture and flavor are considered to be. In accordance with the Standards of Identity of the Food and Drug Administration of the United States, ice cream must contain at least 10% of milk fat. The texture, flavor and mouthfeel characteristics of ice cream, containing at least 10% milk fat, are considered substantially superior to the texture and flavor of frozen desserts containing lower levels of fat, producing an overall consumer preference which is substantially higher than very low fat or non-fat frozen dessert products which seek to mimic the characteristics of ice cream.

There has been substantial technical effort directed to the development of low fat and non-fat frozen desserts in order to provide consumers with products having reduced calories and reduced fat content while preserving the organoleptic appeal of fat-containing frozen desert products. Such efforts include the use of various types of indigestible fat-like materials, such as sucrose polyesters and polyglycerol polyesters which pass through the digestive system without absorption and without contributing calories or the effects of saturated fats, such as butterfat.

Early efforts to provide non-fat frozen dairy desserts were directed to simple formulations wherein the fat normally present in ice cream was replaced with additional non-fat milk solids. U.S. Pat. No. 3,510,316 to Decker is representative of such efforts. The Decker patent is directed to a non-fat frozen dairy dessert which allegedly has comparable body, texture and flavor which are comparable to high butterfat-containing frozen diary dessert of the same total solids content as ice cream. The solids content normally provided by butterfat is replaced by a combination of increased non-fat milk solids and low dextrose equivalent (DE) corn syrup solids. Non-fat milk solids contents are present in the range of 10% to 19%, sugar is present in the range of 9% to 13%, corn syrup solids are present in the range of 9% to 13%, stabilizer is present in the range of 0.2% to 0.5% and an emulsifier is present in the range of 0.04% to 0.15%. The non-fat frozen dairy dessert proposed in the Decker patent is highly desirable in that the contents of the dairy dessert are substantially natural products normally found in ice cream and highly modified or complicated materials are not required in the product. However, the non-fat frozen dairy dessert proposed by the Decker patent has not met with commercial success due to short shelf life and stability.

Efforts to produce non-fat frozen dairy dessert have grown increasingly more complex and numerous efforts have been expended to provide a non-fat frozen dairy dessert containing milk solids which has comparable body-texture and flavor to ice cream containing 10% milk fat. Substantial work has been carried out over an extended period of time with bulking agents, such as powdered and microcrystalline cellulose, in fat-containing a reduced fat food product including frozen dessert formulations. For example, U.S. Pat. Nos. 3,067,037, 3,141,875, 3,157,518, 3,251,824, 3,388,119, 3,539,365, 3,573,058, 3,684,523, 3,947,604, 4,199,368, 4,231,802, 4,346,120, 4,400,406, 4,427,701 and 4,421,778 relate to use of various types of cellulose in frozen dessert products. However, as the fat content is reduced in frozen desserts containing substantial levels of microcrystalline cellulose, adverse organoleptic effects such as a mouthcoating or astringency sensation, and a lack of a well-rounded organoleptic sensation corresponding to that provided by conventional milk fat-containing ice cream products, tend to become more pronounced.

U.S. Pat. No. 4,855,156 to Singer, et al., is directed to frozen whipped dessert products wherein part or all of the milk fat in an ice cream mix formulation is replaced by a macro-colloid comprising substantially non-aggregated particles of denatured protein having in a dry state a mean diameter particle size distribution ranging from about 0.1 micron to about 2.0 microns, with less than about 2% of the total number of particles exceeding 3.0 microns in diameter and wherein the majority of particles are generally spheroidal as viewed at about 800 power magnification under a standard light microscope. The particles in a hydrated state forming the macro-colloid have a substantially smooth, emulsion-like organoleptic character. Proteinaceous macro-colloids are derived from undenatured, substantially soluble proteins obtained from animal, vegetable and microbial sources, such as dairy whey, egg white albumin, soy and bovine serum albumin protein sources.

U.S. Pat. No. 4,400,405 to Morley is directed to a whipped emulsified frozen food of low fat content which is extrudable in continuous form at temperatures in the range of 0° F. to 10° F. for serving by extrusion at home freezer temperatures. The frozen food product of the Morley patent consists essentially of a controlled emulsion of protein, water, sugars, stabilizers and emulsifiers. The protein accounts for 3% to 7%, the water accounts for 54% to 60%, the sugars account for 25% to 29% and the emulsifiers and stabilizers account for 1.1% to 2.7%, all by weight of the product. The Morley patent relies upon providing a saccharide system containing various sugars, a stabilizer system employing at least one stabilizer from each of at least three groups of stabilizers and an emulsifier system having particular emulsifiers to provide an extrudable product at refrigeration temperatures.

U.S. Pat. No. 4,308,294 to Rispoli, et al. is directed to an oil-free, oil-replacement composition having an oily mouthfeel texture and lubricity used in products such as frozen dairy desserts. The composition is formed by hydrating and whipping a protein and a cellulose gum to form a protein phase, hydrating an acid stable modified starch and an acid to form an acid phase, then heating to swell the starch while minimizing bursting, followed by cooling and mixing the protein phase and the acid phase.

U.S. Pat. No. 4,840,813 to Greenberg, et al. is directed to low and non-fat aerated frozen dairy deserts which are alleged to have the organoleptic characteristics of premium, high fat ice cream but which include 0.1% to 7% by weight of fat. The dessert compositions essentially contain 20% to 25% milk solids not fat, 1% to 7% whey protein concentrate, corn syrup solids, sucrose and water. The whey protein to casein weight ratio ranges from 1:0.5 to 4.0. The Greenberg, et al. patent utilizes high temperature pasteurization to denature at least about 50% of the whey protein of the skim milk utilized in the manufacture of the frozen dairy dessert product.

U.S. Pat. No. 4,510,166 to Lenchin is directed to the use of converted starches, such as dextrins, acid-converted starches, enzyme-converted starches and oxidized starches, to replace fat in food products, such as mayonnaise and ice cream.

U.S. Pat. No. 2,590,077 to Lolkema is directed to the use of a highly modified and unusual starting product in a frozen dessert product. The starch product of the Lolkema patent is made by mixing starch (1000 parts by weight) with technical monochloroacetic acid (150 parts by weight) according to Dutch Patent 55,779, which corresponds to U.S. Pat. No. 2,459,108 to Lolkema. A mixture of starch, monochloroacetic acid and water containing ½-2 parts by weight of water per part by weight of the polysaccharide is passed over a rotating drum heated to a temperature of about 100°-180° C. on which the mixture is dried in a period varying from a few seconds to a few minutes. The ethers and esters obtained according to the '108 Lolkema patent consist of small, thin flakes which are removed from the drum after drying, which flakes will readily dissolve in water to homogeneous solution. The Lolkema patent states that the etherified or esterified starch must be produced by the method described to provide the starch in flake form in order for the modified starch to be effective for the stated purpose.

The '077 Lolkema patent specifically states that pregelatinized starch obtained by converting starch in the normal manner is not suitable for use in preparing a vanilla ice in that it will be necessary to use a larger proportion of binding agent and the ice, moreover, will have a more or less granular structure.

Furthermore, it is not clear that the Lolkema patent is directed to the preparation of non-fat frozen desserts. It is indicted in the '077 Lolkema patent, that the process according to the invention may be used both for ice creams and for ices which do not contain cream or another fatty material. However, the only example of the preparation of an ice cream product which is an ice is one wherein milk is utilized. Milk would produce a fat-containing frozen dessert product, since milk contains 3% to 4% milkfat. The Lolkema patent teaches away from the use of unmodified starch and indicates that unmodified starch, when used as a stabilizer for ices, produces ices that are not satisfactory, since they will have a more or less granular structure.

While frozen dairy dessert products of the present invention and those of the prior art are characterized as being non-fat products, from a practical standpoint it is impossible to remove all butterfat from milk in ordinary commercial cream separation processes. Usually, a few hundredths percent of butterfat remains in the skim milk after separating cream from the milk in the most efficient separators. When the skim milk is further concentrated, such as by providing dried skim milk, the butterfat content is increased in proportion to the degree of concentration. Non-fat dry milk solids (dried skim milk) may contain up to about 1.5% fat. Accordingly, the term "non-fat frozen dessert product" as used herein means frozen dessert products which may contain up to about 0.5% butterfat.

Accordingly, it is an object of the present invention to provide non-fat frozen dessert products having organoleptic, stability and body features comparable to those of fat-containing frozen dessert products. It is also an object of the invention to provide essentially non-fat frozen dessert formulations which have a high degree of shelf and flavor stability. It is a further object of the present invention to provide non-fat frozen dairy dessert products from natural materials which have properties comparable to frozen dairy dessert products having more than 7% butterfat.

These and other objects will become more apparent from the following detailed description.

SUMMARY OF THE INVENTION

The present invention is directed to methods for preparing nutritious, low-calorie, substantially fat-free, frozen dessert products having desirable texture and flavor characteristics similar to high milk fat content frozen desserts, such as ice cream, and having substantial shelf and flavor stability with a creamy texture. The present invention is also directed to fat-free frozen dairy dessert products.

The non-fat frozen dairy dessert product of the present invention comprises on a non-flavored basis, from about 8% to about 18% of milk solids not fat, from about 6% to about 15% of a natural sweetener, such as sucrose, from about 6% to about 15% of low dextrose equivalent corn syrup solids having a dextrose equivalent (DE) of from about 25 to about 36, from 0% to about 6% of high DE corn syrup solids having a DE of from about 36 to about 95, from 0% to 6% of dextrin having a DE of less than about 20, from about 0.5% to about 3% of unmodified starch and from 0% to about 0.5% stabilizer.

In the method of the invention, a white mix containing all of the ingredients is prepared by adding the dry ingredients to heated water with agitation. The white mix is pasteurized and homogenized to provide a preblend of the frozen dairy dessert components. The preblend is held for a predetermined period of time and is then aerated and frozen to produce a frozen dessert product having a density in the range of from about 3.5 pounds to about 6 pounds per volume metric gallon.

DETAILED DESCRIPTION OF THE INVENTION

In its composition aspect, the present invention provides a milk protein based, non-fat aerated dessert which has the organoleptic characteristics of high fat ice cream. Also, the present invention provides liquid mixes from which these desserts can be prepared by conventional agitated freezing. The frozen dessert compositions comprise milk solids not fat, sweetener, low dextrose equivalent (DE) corn syrup solids, and starch. Optionally, the frozen dessert compositions may contain a stabilizer, high DE corn syrup solids, dextrins and artificial sweeteners. The high DE corn syrup solids may have been treated to convert a substantial portion of the dextrose to fructose. In its method aspect, the invention resides in the process for preparing the non-fat frozen dairy desserts and liquid mixes therefor from the components of the composition to provide a frozen, aerated, dairy-based dessert product having surprising qualities in view of the simple and inexpensive nature of the components used in the preparation thereof. Each of the composition components and essential characterizing product features and preparation steps are described in detail below.

Throughout the Specification and claims, percentages and ratios are by weight and temperatures are in degrees Fahrenheit unless otherwise indicated.

In an important embodiment, the composition of the present invention which can be used to prepare non-fat frozen aerated dessert products generally has the following components as set forth in Table I.

TABLE I

| Ingredient | Range |
| --- | --- |
| Milk Solids Not fat | 12–16 |
| Sucrose | 10–14 |
| Corn Syrup Solids (25–36DE) | 10–14 |
| Unmodified Starch | 0.75–2.0 |
| Stabilizer | 0.1–0.5 |
| Water | q.s. |

Skim milk has about 9% milk solids not fat. Accordingly, skim milk cannot be used as the sole source of milk solids not fat for the compositions of Table I without being treated or supplemented with additional milk solids not fat. In one method of providing a suitable level of milk solids not fat, the skim milk may be concentrated by condensation in accordance with well known processes to produce condensed skim milk having from about 20% to 35% total solids. It has been determined, however, that an acceptable product can be made through use of dried milk solids not fat, i.e., dried skim milk or a combination of skim milk and dried skim milk.

The corn syrup solids used in the compositions of the present invention are low dextrose equivalent (DE) corn syrup. Low DE corn syrup has a high viscosity and can be used in a water phase at relatively high concentrations. Corn syrup is produced from a suspension containing 35%–40% or corn starch in water. The suspension is fed to an autoclave and sufficient hydrochloric acid is added to provide a concentration of about 0.02 NHCl. The autoclave is heated by introduction of steam until a temperature of about 150° C. is reached. The mixture is held at this temperature for a period of time sufficient to produce the required degree of hydrolysis. This is specified analytically by the percentage of reducing sugar in the dry solids of the hydrolysate and ranges from about 20% to about 60% depending upon the type of product desired. The contents of the autoclave are then neutralized to pH 4–5 by the addition of soda ash. The neutralized hydrolyzate further refined by filtration and treatment with activated carbon and is then evaporated to provide a heavy syrup. The final syrup contains about 75%–80% dry solids. Corn syrup may also be dried to form corn syrup solids with moisture contents of approximately 5%.

Corn syrup is specified on the basis of reducing sugar content on a dry basis. This is designated as dextrose equivalent or DE, when calculated as dextrose. Corn syrup is marketed with various concentrations of solids usually determined by density determination and designated in degrees Baume' (Be'). Typically, cornstarch syrups are marketed at densities of 41°–45° Be'.

In accordance with the present invention, low DE corn syrups or corn syrup solids are used in the compositions of the invention. By low DE corn syrups is meant those corn syrups having a DE of from about 25 to about 36. Such low DE corn syrups have a very high viscosity and relatively low sweetness. The relatively low sweetness is the result of having low levels of reducing sugars, such as dextrose and maltose, and relatively high levels of non-reducing sugars such as trisaccharides and higher saccharides. The low DE corn syrup is preferably used in the compositions of the invention at a level of from about 10% to about 14% on a dry solids basis.

The low DE corn syrup solids used in the compositions of the present invention are to be distinguished from dextrins. Dextrins are a polymer of d-glucose which is intermediate in complexity between starch and maltose. The term "dextrin" means a product obtained by hydrolysis of starch to provide a product having a very DE of less than about 20 (see "Sugar Confectionery and Chocolate Manufacture", R. Lees et al., Leonard Hill of the Blackee Publishing Group, Bishopbriggs, Glasgow, Scotland, 1973, p. 34).

The individual ingredients comprising the compositions of the invention may be varied over a wide range by adjusting the level of other ingredients. For example, the level of sucrose may be greatly reduced if high DE corn syrup solids are used. The sucrose may be completely replaced by use of an artificial sweetener.

The starch may be any unmodified food starch, such as cornstarch, potato starch, rice starch or tapioca starch. The starch used in the compositions of the present invention is preferably unmodified cornstarch either a native or a cold-water swelling cornstarch. The cornstarch is preferably cold-water swelling to provide further ease in the preparation of the white mix of the invention which is used to prepare the aerated frozen dessert products, although native ungelatinized starch may be used. When native starch is used, it is first cooked to gelatinize the starch prior to use.

"Modified" starch is a term well understood in the food art. Surprisingly, it has been determined that modified starches, such as hydroxypropylated cornstarch, are not suitable for use in the non-fat frozen desserts of the present invention. A non-fat frozen dessert made with a modified starch was found to have an aerated structure that collapsed with unacceptable product shrinkage after only a few weeks of storage under thermal cycling temperature abuse conditions.

Modified starches are described in 21 C.F.R. §172.892. The term "modified starch" is readily understood by those skilled in the art and modified starches are suitable for use in the present invention.

Stabilizers are not required in the non-fat frozen dessert products of the invention. However, the use of stabilizers may improve the texture and stability of some compositions. The stabilizers useful in the present invention are those well recognized and understood for use in the manufacture of ice cream. Such stabilizers include carboxymethyl cellulose, alginates, xanthan gum, carob bean gum, guar gum, locust bean gum, carrageenan, gum tragacanth, and gelatin. In addition to those stabilizers which are well known for the use in the manufacture of ice cream, a preferred stabilizer for use in the present invention is pectin. While pectin has been described for use in the manufacture of frozen desserts, such as set forth in U.S. Pat. No. 4,874,627 to Greig, the use of pectin in the manufacture of dairy products is not well recognized and is not recommended by manufacturers of pectin. The use of pectin as the stabilizer in the present invention is particularly preferred since pectin is a natural product derived from fruit.

In the method of the present invention, the water required for the manufacture of the white mix is added to a kettle provided with an agitating device. The preferred agitating device is a Lanco mixer which is provided with a rotating disc at the bottom of the mixer bowl. The disc is provided with a series of upwardly extending projections which causes the mixer to operate in the manner of a large blender. The Lanco mixer is preferably operated at its highest speed.

The water is heated to a temperature of from about 100° F. to about 160° F., preferably about 150° F. The order of addition of the individual ingredients is not important. The ingredients may all be added to the heated water at the same time, provided that the starch used is a cold-water swelling starch or has been gelatinized by cooking. A white mix is formed after a period of agitation of from about 10 to about 40 minutes. The following order of addition, however, is preferred.

The stabilizer and cold-water swelling starch are added to the heated water and agitation is commenced and continued for a period of from about 2 to about 15 minutes, preferably about 10 minutes. The sugar is then added and agitation is continued for an additional 5 to 10 minutes. Dry corn syrup solids or corn syrup, condensed skim milk and dry milk solids not fat (if used) are added and agitation is continued for an additional 2 to 10 minutes, preferably 5 minutes, to provide the white mix. The white mix is then pasteurized under suitable time and temperature conditions, preferably at a temperature of from about 180° F. to about 225° F. for 30 to 60 seconds, most preferably at a time of about fifty seconds. The heated white mix is then homogenized in a two-stage homogenizer at a total pressure of 2,200 psig and 500 psig second stage. The white mix is then cooled to a temperature of 160° F. to 180° F. and is decanted into containers and cooled to about 40. F. The white mix is held at 40° F. for a period of about 6 to about 100 hours. The cooled white mix is then aerated under agitating conditions in a conventional ice cream freezer. The aerated ice cream mix has an overrun of from about 80% to about 100% and exits from the ice cream freezer at a temperature in the range of from about 18° F. to about 23° F. The aerated ice cream is then placed in containers and hardened at a temperature in the range of from about −10° F. to about −25° F. for a period of from about 20 hours to about 40 hours, prior to distribution.

The compositions of the present invention for providing a non-fat frozen dairy dessert are extremely simple and inexpensive. The compositions in essence are an improvement of the compositions previously proposed in U.S. Pat. No. 3,510,316 to Decker. The frozen desserts obtained from the compositions of the present invention are a significant improvement over the non-fat frozen desserts provided from the teachings of the Decker patent. The frozen dairy dessert of the present invention is stable, has an extended shelf life and has no off flavors after storage. There is no significant collapse of the frozen dairy dessert of the invention after significant periods of storage and/or temperature abuse for a period of up to 6 weeks and no lactose crystallization (sandiness) is observed. Non-fat frozen dessert products made in accordance with the teachings of the Decker patent become icy after two weeks under thermal cycling temperature abuse conditions and exhibit significant lactose crystallization (sandiness) at six weeks of these conditions. The frozen dairy dessert of the invention has a good mouthfeel and has the organoleptic properties of a frozen dairy dessert containing substantial levels of milk fat. The frozen dairy dessert products of the present invention improve in taste with hardening.

The following examples further illustrate various features of the present invention that are intended to in no way limit the scope of the invention which is defined in the appended claims.

EXAMPLE I

A 150 lb. batch of vanilla ice cream was made using the following components at the indicated levels:

| Ingredient | Level/lbs. |
| --- | --- |
| Condensed skim milk (30% solids) | 65 |
| Cold-water swelling unmodified starch Staley Miragel TM | 1.59 |
| Corn syrup 25 DE, 42 Baume | 19.23 |
| Sucrose | 18 |
| Pectin | .18 |
| Water | 46 |
|  | 150 |

The water was heated to 150° F. and placed in a Lanco mixer. The Lanco mixer was set to the highest speed and the pectin, starch and sucrose were added. After 10 minutes of agitation the corn syrup and condensed skim milk were added. After 2 minutes of additional mixing a white mix was formed. The white mix was HTST pasteurized at 220° F. for 50 seconds. The white mix was homogenized at 2200 psig total pressure and 500 psig second stage and cooled to 40° F. for 10 hours. 230 ml of natural vanilla flavor was added. The white mix was then pumped to a scraped wall ice cream freezer. The white mix exited from the freezer at a temperature of 22° F. and 100% overrun. The aerated frozen white mix was placed in containers and hardened at −20° F. for 24 hours to provide vanilla ice cream.

What is claimed is:

1. A non-fat frozen dairy dessert having organoleptic properties and body comparable to a milk fat containing frozen dairy dessert comprising from about 8% to about 18% of milk solids not fat, from about 6% to about 15% of sweetener, from about 6% to about 15% of corn syrup solids having a DE of from about 25 to about 36, from 0% to 6% of corn syrup solids having a DE of from about 36 to about 95, from 0% to 6% of dextrins having a DE of less than about 20, from about 0.5% to about 3% unmodified starch and from 0% to about 0.5% of stabilizer.

2. A frozen dessert in accordance with claim 1 wherein said unmodified starch is selected from the group consisting of cornstarch, potato starch, tapioca starch, and rice starch.

3. A frozen dessert in accordance with claim 1 wherein said starch is an unmodified cornstarch.

4. A frozen dessert in accordance with claim 2 wherein said cornstarch is a waxy maize corn starch.

5. A frozen dessert in accordance with claim 2 wherein said starch is cold-water swelling.

6. A frozen dessert in accordance with claim 1 wherein said milk solids not fat are provided from condensed skim milk.

7. A frozen dessert in accordance with claim 1 wherein said milk solids not fat are provided by a mixture of skim milk and dried skim milk.

8. A frozen dessert in accordance with claim 1 wherein said milk solids not fat are provided by dried skim milk.

9. A frozen dessert in accordance with claim 1 wherein said stabilizer is present at a level of from about 0.1% to about 0.5% and is selected from the group consisting of pectin, carboxymethyl cellulose, alginates, xanthan gum, guar gum, carob bean gum, locust bean gum, carrageenan, gum tragacanth and gelatin.

10. A frozen dessert in accordance with claim 9 wherein said stabilizer is pectin.

11. A frozen dessert in accordance with claim 1 wherein said unmodified starch is selected from the group consisting of cornstarch potato starch, rice starch and tapioca starch.

12. A frozen dessert in accordance with claim 1 wherein said sweetener is present at a level of from about 10% to about 14%, said milk solids not fat are present at a level of from about 12% to about 16%, said low DE corn syrup solids are present at a level of from about 10% to about 14%, said unmodified starch is present at a level of from about 0.5% to about 3% and said stabilizer is present at a level of from about 0.1% to about 0.5%.

13. A method for producing a frozen dessert comprising heating water to a temperature of from about 100° F. to about 160° F., agitating said water, adding the ingredients of claim 1 to said water to provide a preblend, agitating said preblend for a period of from about 10 to 40 minutes to form a white mix, pasteurizing and homogenizing said white mix, cooling said white mix to a temperature of from about 35° F. to about 45° F., holding said white mix at said cooled temperature for a period of from about 6 to about 100 hours and freezing said white mix under aerating and agitating conditions to provide a non-fat frozen dessert product having a composition in accordance with claim 1.

14. A method in accordance with claim 13 wherein said starch is selected from the group consisting of cornstarch, potato starch, tapioca starch and rice starch.

15. A method in accordance with claim 13 wherein said starch is an unmodified cornstarch.

16. A method in accordance with claim 15 wherein cornstarch is a waxy maize cornstarch.

17. A method in accordance with claim 13 wherein said milk solids not fat are provided from condensed skim milk.

18. A method in accordance with claim 13 wherein said milk solids not fat are provided by a mixture of skim milk and dried skim milk.

19. A method in accordance with claim 13 wherein said milk solids not fat are provided by dried skim milk.

20. A method in accordance with claim 13 wherein said stabilizer is present at a level of from about 0.1% to about 0.5% and is selected from the group consisting of pectin, carboxymethyl cellulose, alginates, xanthan gum, carob bean gum, locust bean gum, guar gum, carrageenan, gum tragacanth and gelatin.

21. A method in accordance with claim 20 wherein said stabilizer is pectin.

22. A method in accordance with claim 13 wherein said agitation step is performed in a high shear agitator.

23. A method in accordance with claim 22 wherein said high shear agitator is a blender-type agitator.

* * * * *